United States Patent
Muravev et al.

(10) Patent No.: US 12,332,443 B2
(45) Date of Patent: Jun. 17, 2025

(54) NEAR-EYE DISPLAY DEVICE, AUGMENTED REALITY GLASSES INCLUDING SAME, AND OPERATING METHOD THEREFOR

(71) Applicant: Samsung Electronics Co., Ltd., Suwon-si (KR)

(72) Inventors: Nikolay Victorovich Muravev, Moscow region (RU); Dmitriy Evgenyevich Piskunov, Moscow region (RU); Gavril Nikolaevich Vostrikov, Moscow region (RU); Andrey Nikolaevich Putilin, Moscow region (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 653 days.

(21) Appl. No.: 17/551,778

(22) Filed: Dec. 15, 2021

(65) Prior Publication Data

US 2022/0107501 A1 Apr. 7, 2022

Related U.S. Application Data

(63) Continuation of application No. PCT/KR2020/007852, filed on Jun. 17, 2020.

(30) Foreign Application Priority Data

Jul. 12, 2019 (RU) .......................... RU2019121958
Mar. 24, 2020 (KR) ........................ 10-2020-0035816

(51) Int. Cl.
*G02B 27/01* (2006.01)
*F21V 8/00* (2006.01)

(52) U.S. Cl.
CPC ....... *G02B 27/0172* (2013.01); *G02B 6/0036* (2013.01); *G02B 6/0055* (2013.01); *G02B 2027/0178* (2013.01)

(58) Field of Classification Search
CPC .................. G02B 27/0172; G02B 6/0036; G02B 6/0055; G02B 2027/0178
See application file for complete search history.

(56) References Cited

U.S. PATENT DOCUMENTS 5,768,454 A 6/1998 Chesnoy et al.
7,764,413 B2 7/2010 Levola
(Continued)

FOREIGN PATENT DOCUMENTS

CN 1365016 A 8/2002
CN 106575034 A 4/2017
(Continued)

OTHER PUBLICATIONS

Extended European Search Report dated Aug. 10, 2022, issued in European Patent Application No. 20840009.3.
(Continued)

*Primary Examiner* — Abdulmajeed Aziz
*Assistant Examiner* — Jessica M Apenteng
(74) *Attorney, Agent, or Firm* — Jefferson IP Law, LLP

(57) ABSTRACT

A near-eye display device, an augmented reality device including the near-eye display device, and an operation method of the near-eye display device are provided. The near-eye display device includes a first expanding waveguide including a first expanding diffractive grating and a second waveguide including a second diffractive grating. The first expanding diffractive grating and the second diffractive grating are located on different planes.

20 Claims, 9 Drawing Sheets

(56) References Cited

U.S. PATENT DOCUMENTS

| | | | |
|---|---|---|---|
| 8,160,411 B2 | 4/2012 | Levola et al. | |
| 8,194,325 B2 | 6/2012 | Levola et al. | |
| 8,472,119 B1* | 6/2013 | Kelly | G02B 27/017 |
| | | | 359/630 |
| 9,507,150 B1 | 11/2016 | Stratton et al. | |
| 9,933,684 B2 | 4/2018 | Brown et al. | |
| 10,120,191 B2 | 11/2018 | Rudolph et al. | |
| 10,295,824 B2 | 5/2019 | Brown et al. | |
| 10,330,934 B2 | 6/2019 | Takeda et al. | |
| 2002/0122015 A1 | 9/2002 | Song et al. | |
| 2009/0190222 A1 | 7/2009 | Simmonds et al. | |
| 2010/0296163 A1 | 11/2010 | Saarikko | |
| 2010/0328794 A1 | 12/2010 | Levola et al. | |
| 2012/0243102 A1 | 9/2012 | Takeda et al. | |
| 2014/0140654 A1 | 5/2014 | Brown et al. | |
| 2014/0211322 A1 | 7/2014 | Bohn et al. | |
| 2014/0218801 A1* | 8/2014 | Simmonds | G02B 27/1086 |
| | | | 359/567 |
| 2016/0077338 A1 | 3/2016 | Robbins et al. | |
| 2016/0124229 A1 | 5/2016 | Yokoyama | |
| 2016/0306171 A1 | 10/2016 | Rudolph et al. | |
| 2016/0320536 A1 | 11/2016 | Simmonds et al. | |
| 2017/0003504 A1 | 1/2017 | Vallius et al. | |
| 2017/0315356 A1 | 11/2017 | Tervo | |
| 2017/0322426 A1 | 11/2017 | Tervo | |
| 2018/0210198 A1* | 7/2018 | Brown | G02B 27/0081 |
| 2018/0252857 A1 | 9/2018 | Glik et al. | |
| 2019/0004321 A1 | 1/2019 | Grey et al. | |
| 2019/0155027 A1 | 5/2019 | Marshall | |

FOREIGN PATENT DOCUMENTS

| | | |
|---|---|---|
| CN | 109073886 A | 12/2018 |
| CN | 109073894 A | 12/2018 |
| FR | 2 742 881 A1 | 6/1997 |
| IN | 201717003946 A | 4/2017 |
| JP | 2012-198392 A | 10/2012 |
| KR | 10-2012-0014597 A | 2/2012 |
| KR | 10-2016-0089392 A | 7/2016 |
| WO | 2018/096359 A2 | 5/2018 |

OTHER PUBLICATIONS

Wikipeida, Microsoft HoloLens, https://en.wikipedia.org/wiki/Microsoft_HoloLens, Mar. 30, 2016.
HoloLens (1st gen) hardware, Microsoft Docs, https://www.microsoft.com/en-us/hololens/hardware, Nov. 23, 2021.
Wikipeida, HoloLens 2, https://en.wikipedia.org/wiki/HoloLens_2, Nov. 2019.
International Search Report dated Oct. 8, 2020, issued in International Patent Application No. PCT/KR2020/007852.
Russian Search Report dated Nov. 11, 2019, issued in Russian Patent Application No. 2019121958.
Russian Office Action dated Nov. 12, 2019, issued in Russian Patent Application No. 2019121958.
Russian Decision on Grant dated Feb. 25, 2020, issued in Russian Patent Application No. 2019121958.
Guang-Xin Xiang et al., Design of a Holographic Waveguide with L Configuration, Mar. 2017.
Chinese Office Action dated Oct. 28, 2023, issued in Chinese Application No. 202080048090.5.
Intention to Grant dated Jun. 28, 2024, issued in European Application No. 20 840 009.3-1001.
Korean Office Action dated Feb. 12, 2025, issued in Korean Application No. 10-2020-0035816.

* cited by examiner

NEAR-EYE DISPLAY DEVICE, AUGMENTED REALITY GLASSES INCLUDING SAME, AND OPERATING METHOD THEREFOR

CROSS-REFERENCE TO RELATED APPLICATION(S)

This application is a continuation application, claiming priority under § 365(c), of an International application No. PCT/KR2020/007852, filed on Jun. 17, 2020, which is based on and claims the benefit of a Russian Patent Application number. 2019121958, filed on Jul. 12, 2019, in the Russian Intellectual Property Office, and of a Korean patent application number 10-2020-0035816, filed on Mar. 24, 2020, in the Korean Intellectual Property Office, the disclosure of each of which is incorporated by reference herein in its entirety.

BACKGROUND

1. Field

The disclosure relates to a near-eye display device, an augmented reality device including the near-eye display device, and an operation method of the near-eye display device.

2. Description of Related Art

Wearable near-eye display devices are frequently used. Users need an augmented reality (AR) device, a virtual reality (VR) device, or the like having a wide field of view (FOV), a low weight, a low cost, a small size, and a high resolution. Such wearable near-eye display devices may replace televisions (TVs) and smartphones.

For example, an augmented reality glass system requires the possibility of superimposing a virtual image on a large area, a low weight, low costs, a high resolution, a high contrast, etc., to achieve a wide viewing angle enabling the human eye to cover the entire area seen by a person.

When these requirements are achieved, near-eye display devices can provide a large area and a wide FOV that enable eyes to see the entire image without loss. There are several approaches to achieve these requirements. Some approaches can provide a wide FOV, but cannot provide a large area enabling eyes to see the entire image without loss. Other approaches can provide a large area enabling eyes to see the entire image without loss, but cannot provide a wide FOV.

Existing systems that do not use multiplication of an exit pupil are equipped with input and output gratings (hologram optical element (HOE) or diffractive optical element (DOE)). These systems operate schematically as follows. A projector forms an image at infinity in which a parallel beam is formed, where an input hologram or input diffractive element positioned on a waveguide is placed in an exit pupil of the projector. Due to diffraction of an element, the parallel beam is introduced into the waveguide without breaking parallelism, and then, due to internal total reflection, the beam expands in the waveguide and enters an output diffractive element (HOE/DOE).

In this case, because a light beam of only one diffraction order among light beams transmitted through a diffractive grating is used and the input and output gratings are only used on one plane, a wide field at an input turns into a narrow picture at an output. The narrow picture is not comfortable to look at, because, when the pupil of the eye looks forward, only the central field of an image is seen clearly. An image portion located at the edge of the narrow picture represents a dark region, and, when the pupil of the eye moves in a vertical direction, a center portion is displayed as a dark region. In other words, users can see only narrow strips of an image.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a near-eye display device capable of providing a wide field of view (FOV).

Another aspect of the disclosure is to provide an augmented reality device capable of providing a wide FOV.

Another aspect of the disclosure is to provide an operation method of a near-eye display device capable of providing a wide FOV.

Additional aspects will be set forth in part in the description which follows and, in part, will be apparent from the description, or may be learned by practice of the presented embodiments.

In accordance with an aspect of the disclosure, a near-eye display device is provided. The near-eye display device includes a projection system configured to display an image, a first expanding waveguide including a first surface, and a second surface opposite to the first surface, wherein light from the projection system is incident upon the first surface or the second surface, a first expanding diffractive grating included in the first expanding waveguide, a second waveguide upon which light emitted from the first expanding waveguide is incident, and a second diffractive grating included in the second waveguide. The first expanding diffractive grating and the second diffractive grating are located on different planes so that 0-order diffracted light emitted from the first expanding waveguide is incident upon the second waveguide.

The light from the projection system may be incident upon the first expanding waveguide, and an angle at which the light is incident upon the first expanding diffractive grating may have a range of 0 to 90 degrees with respect to a normal to a surface of the first expanding waveguide.

A grating line of the first expanding diffractive grating may be arranged along projection of light from the projection system onto the first expanding diffractive grating.

An acute angle between a projection of a main light beam of the projection system onto a plane of the first expanding waveguide and a grating line of the first expanding diffractive grating may have a range of (+)30 degrees to (−)30 degrees.

The first expanding diffractive grating may be located on the first surface of the first expanding waveguide upon which the light from the projection system is incident.

The second surface of the first expanding waveguide may have a mirror coating.

The light from the projection system may be incident upon the first surface, and the first expanding diffractive grating may be located on the second surface.

The second waveguide may include a first region upon which light is incident, a second region where the light does not enter an eye of a user, and a third region where light enters a pupil of the eye.

The near-eye display device may be configured so that diffraction does not occur in the second region of the second waveguide.

The second diffractive grating may be configured to have a relationship of diffraction efficiency of the first region>diffraction efficiency of the third region>diffraction efficiency of the second region.

The second diffractive grating may be configured to have a relationship of diffraction efficiency of the first region>diffraction efficiency of the second region=diffraction efficiency of the third region.

The first region of the second diffractive grating may have high diffraction efficiency and the second region and the third region may have gradient diffraction efficiency.

The first region of the second diffractive grating may have high diffraction efficiency, the second region may have lower diffraction efficiency than the first region, and the third region may have gradient diffraction efficiency.

The first expanding waveguide and the second waveguide may constitute a monolithic curve-shaped waveguide.

Each of the first expanding waveguide and the second waveguide may be configured with one of a diffractive optical element and a hologram element.

The second diffractive grating may include an input coupling diffractive grating and an output coupling diffractive grating on a single surface.

In accordance with another aspect of the disclosure, augmented reality glasses are provided. The augmented reality glasses include an element for a left eye and an element for a right eye. At least one of the element for the left eye and the element for the right eye includes a projection system, a first expanding waveguide including a first surface, and a second surface opposite to the first surface, wherein light from the projection system is incident upon the first surface, a first expanding diffractive grating included in the first expanding waveguide, a second waveguide upon which light emitted from the first expanding waveguide is incident, and a second diffractive grating included in the second waveguide. The first expanding diffractive grating and the second diffractive grating are located on different planes so that 0-order diffracted light output by the first expanding waveguide is incident upon the second waveguide.

The element for a left eye may be located separate from the element for a right eye, and the element for a right eye may be coupled with the element for a right eye.

In accordance with another aspect of the disclosure, an operation method of a near-eye display device is provided. The operation method includes making light from a projection system be incident upon a first expanding diffractive grating, forming (−1)-order diffraction, 0-order diffraction, and (+1)-order diffraction from respective diffractions of light beams incident upon the first expanding diffractive grating, outputting the 0-order diffracted light from a first expanding waveguide and inputting the 0-order diffracted light to a second waveguide, extending (−1)-order diffracted light and (+1)-order diffracted light in the first expanding waveguide due to internal total reflection and feeding the extended (−1)-order diffracted light and the extended (+1)-order diffracted light back to the first expanding diffractive grating and making the extended (−1)-order diffracted light and the extended (+1)-order diffracted light be incident upon different locations on the first expanding diffractive grating, and forming new (−1)-order diffraction, new 0-order diffraction, and new (+1)-order diffraction from each of the (−1)-order diffracted light and the (+1)-order diffracted light.

Each 0-order diffracted light incident upon the second waveguide may pass a second diffractive grating via the second waveguide, diffraction of each ray incident upon the second diffractive grating may form (−1)-order diffraction, 0-order diffraction, and (+1)-order diffraction, and the (+1)-order diffraction may be reflected by a surface of the second waveguide opposite to a surface of the second waveguide facing an eye and may be incident again upon the second diffractive grating.

A near-eye display device according to an embodiment may provide a wide field of view. The near-eye display device according to an embodiment may reduce a manufacturing cost by including an input coupling diffractive grating and an output coupling diffractive grating on a single plane.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
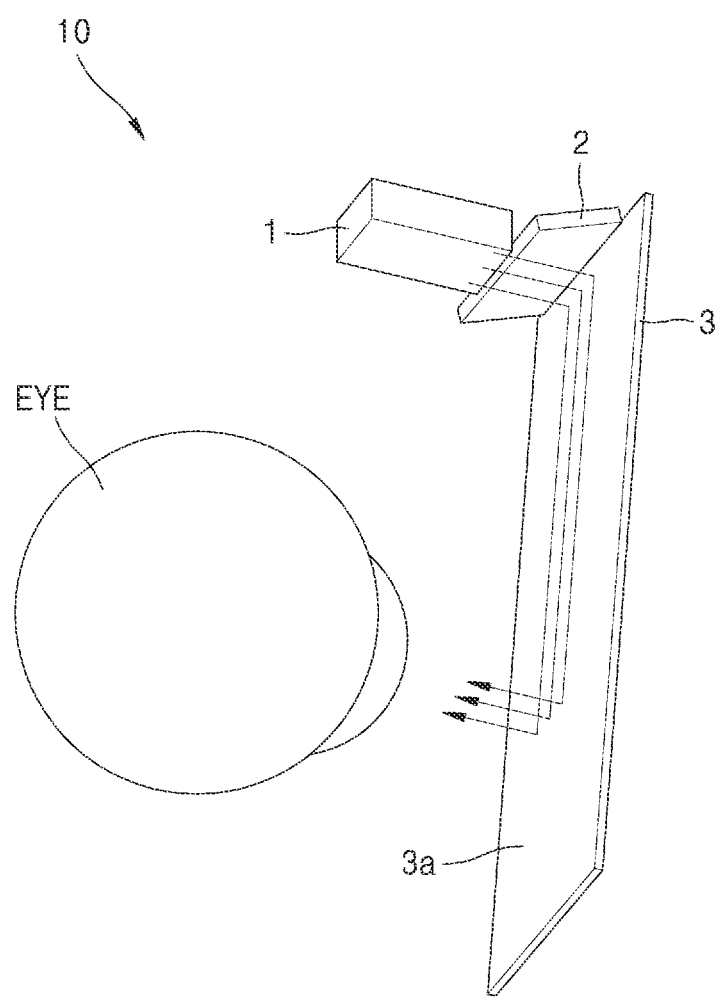
FIG. 1 is a view schematically illustrating a near-eye display device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A near-eye display device, an augmented reality device including the near-eye display device, and an operation method of the near-eye display device, according to an embodiment, will now be described.

Like reference numerals in the drawings denote like elements, and, in the drawings, the sizes of elements may be exaggerated for clarity and for convenience of explanation. While such terms as "first", "second", etc., may be used to describe various components, such components must not be limited to the above terms. The above terms are used only to distinguish one component from another.

An expression used in the singular encompasses the expression of the plural, unless it has a clearly different meaning in the context. The terms "comprises" and/or "comprising" or "includes" and/or "including" when used in this specification, specify the presence of stated elements, but do not preclude the presence or addition of one or more other elements. In the drawings, the sizes or thicknesses of elements may be exaggerated for clarity of explanation. It will be understood that when a material layer is referred to as being "formed on" a substrate or another layer, it can be directly or indirectly formed on the substrate or the other layer. That is, for example, intervening layers may be present. Materials that constitute each layer in embodiments below are exemplary, and thus the other materials may be used.

The terms "unit", "-er (-or)", and "module" when used in this specification refers to a unit in which at least one function or operation is performed, and may be implemented as hardware, software, or a combination of hardware and software.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent various functional relationships and/or physical or logical couplings between the various elements. It should be noted that many alternative or additional functional relationships, physical connections or logical connections may be present in a practical device.

The use of the terms "a" and "an" and "the" and similar referents are to be construed to cover both the singular and the plural.

The operations that constitute a method can be performed in any suitable order unless otherwise indicated herein. The use of any and all language (e.g., "such as") provided herein is intended merely to explain the technical spirit of the disclosure in detail and does not pose a limitation on the scope of the disclosure unless otherwise claimed.

FIG. 1 is a view schematically illustrating a near-eye display device 10 according to an embodiment of the disclosure.

The near-eye display device 10 may be used as an independent device for one eye (monocular). Alternatively, a near-eye display device may be included in each of two eyes. When the near-eye display devices are coupled for a left eye and a right eye, a user may watch a stereo image. The near-eye display device may be used in, for example, augmented reality glasses, augmented reality helmets, virtual reality glasses, and the like.

Referring to FIG. 1, the near-eye display device 10 may include a projection system 1, a first expanding waveguide 2 upon which light from the projection system 1 is incident, and a second waveguide 3. The light may pass through the first expanding waveguide 2 to the second waveguide 3 such that the light reflects off of a second diffractive grating 3a of the second waveguide 3 in a direction of an eye.

Figure 2:
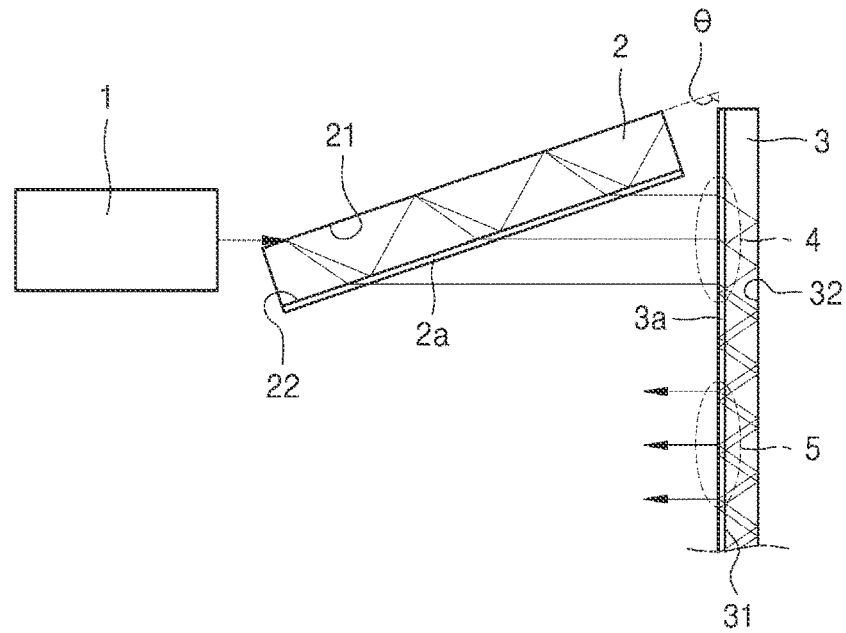
FIG. 2 is a plan view of the near-eye display device of FIG. 1 according to an embodiment of the disclosure.

FIG. 2 is a schematic plan view of the near-eye display device according to an embodiment of the disclosure.

Referring to FIG. 2, the first expanding waveguide 2 may include a first surface 21 upon which light from the projection system 1 is incident, and a second surface 22 opposite to the first surface 21. For example, the first surface 21 and the second surface 22 may be parallel to each other. However, embodiments are not limited thereto.

A first expanding diffractive grating 2a may be included in the first expanding waveguide 2. For example, the first expanding diffractive grating 2a may be arranged on the second surface 22. The first expanding diffractive grating 2a may be, for example, transmissive.

A second expanding diffractive grating 3a may be included in the second waveguide 3. The second waveguide 3 may include a third surface 31 upon which light output by the first expanding waveguide 2 is incident, and a fourth surface 32 opposite to the third surface 31. The second expanding diffractive grating 3a may be arranged on the third surface 31. For example, the third surface 31 and the fourth surface 32 may be parallel to each other. However, embodiments are not limited thereto.

The first expanding waveguide 2 and the second waveguide 3 may be located on different planes. For example, the first expanding waveguide 2 and the second waveguide 3 may be located on different planes within an angle range that is more than 0 degree and equal to or less than 180 degrees. For example, an angle (θ) between the first surface 21 of the first expanding waveguide 2 and the third surface 31 of the second waveguide 3 may have a range that is greater than 0 degree and equal to or less than 180 degrees. 0-order diffracted light output by the first expanding diffractive grating 2a may be emitted from the first expanding waveguide 2 at the same angle as the light incident upon the first expanding waveguide 2. Thus, the light incident upon the first expanding waveguide 2 may be widely expanded through internal total reflection within the first expanding waveguide 2, pass through the first expanding waveguide 2 without refraction, and may be incident upon the second waveguide 3. The first expanding waveguide 2 and the second waveguide 3 may be transparent.

When the projection system 1 is used for each of the two eyes of a user, an identical image may be used. As another example, when each projection system and a separate waveguide for each eye are used, the projection system may project each image for each eye. The projection system 1 may be located on a lateral side of the first expanding waveguide 2.

For example, a near-eye display device for displaying augmented reality may be provided for each of the right eye and the left eye to configure glasses for displaying augmented reality.

Referring to FIG. 2, the second diffractive grating 3a may have a structure in which an input coupling diffractive grating 4 receiving light and an output coupling diffractive grating 5 are arranged on one surface. Accordingly, this case may reduce manufacturing costs, compared with when an input coupling diffractive grating and an output coupling diffractive grating are arranged on different surfaces.

The near-eye display device includes an element for right eyes and an element for left eyes, and each of the elements may include the projection system 1, the first expanding waveguide 2 including the first expanding diffractive grating 2a, and the second waveguide 3 including the second diffractive grating 3a. The second waveguide 3 may include a light input region, an intermediate region preventing output light from entering the eye, and a region of useful light output enabling light to enter the pupil of the eye when the pupil moves while watching an image. This will be described later in detail.

A display device according to an embodiment enables avoidance of a limitation of a field of view when viewing an image vertically and horizontally. In other words, a visual field of view, eye movement, and reproduction efficiency may be increased, and spectacle systems have small sizes and are therefore easily manufactured at low costs. These merits are achieved by the fact that an input coupling diffractive grating and an output coupling diffractive grating are configured as a single diffractive grating and light from an expanding diffractive grating for multiplexing or expanding light from a projection system is coupled to a diffractive grating for inputting/outputting to/from a waveguide. According to an embodiment, it needs to be noted that a holographic diffractive grating may be used as the diffractive grating.

The term below is used to explain embodiments.

An eyeball movement box (EMB) represents an inside region of an eye where the eye can completely see the entire virtual image without loss while the eyeball is moving. A first expanding waveguide including a first expanding diffractive grating may be a system that multiplies an exit pupil. In other words, several exit pupils instead of one exit pupil may be formed at an output from the first expanding waveguide, and the first expanding diffractive grating and the first expanding waveguide may be arranged close to each other or in contact with each other or may be spaced apart from each other by a certain distance. Such formation of a multiplied exit pupil provides a wide eye movement area and thus allows the entire virtual image to be completely viewed without loss. The expansion or multiplexing of a light beam refers to an increase in a width (transverse dimension of a beam) that does not cause distortion (aberration).

An exit pupil (or the pupil of an optical system) represents a paraxial image of an aperture stop in an image space formed by the optical system in a direct course of a ray. This term is well established in the field of optics. A major property of the exit pupil is that the entire image field exists at any time point. The multiplication of the exit pupil may increase the size of the exit pupil without increasing a longitudinal dimension of the optical system.

A classical optical system increases the size of an exit pupil and the longitudinal dimension of the classical optical system increases, whereas a waveguide optical device according to an embodiment may increase the size of the exit pupil without increasing the longitudinal dimension due to multiple reflections of light rays inside a waveguide. According to an embodiment, an expansion characteristic may appear when the waveguide and grating lines of a diffractive grating are positioned at specific angles with respect to incident light. These will be discussed below. Diffraction efficiency is a property of a diffractive grating measured in unit percent or in part. Diffraction efficiency is a ratio of the energy contained in one of diffraction orders to the energy incident on the diffractive grating. Diffraction efficiency is well known.

According to an embodiment, the projection system 1 is inclined at a certain angle with respect to the first expanding diffractive grating 2a and the first expanding waveguide 2. When the first expanding diffractive grating 2a is applied to the first expanding waveguide 2, grating lines of the first expanding diffractive grating 2a may be oriented such that some of received diffraction orders of the incident light head along the first expanding waveguide 2 having internal total reflection.

Light incident upon the first expanding diffractive grating 2a propagates in three directions, but 0, (−1), and (+1) diffraction orders are formed. A diffractive grating may be created according to many methods. For example, a relief diffractive grating may be formed by etching through a mask or nano imprinting, and a holographic diffractive grating may be recorded as an interference pattern. For example, a theoretical angle range between waveguides (between a first expanding waveguide and a second waveguide) and a theoretical angle range between corresponding diffractive gratings (between a first expanding diffractive grating and a second diffractive grating) may be, for example, (+)90 degrees to (−)90 degrees. A range of a grating period of the first expanding diffractive grating 2a may be, for example, 1200 nm to 400 nm with respect to a visible color. A range of a grating period of the second diffractive grating 3a may be, for example, 700 nm to 200 nm.

Each of the first expanding waveguide 2 and the second waveguide 3 may be configured with one of a diffractive optical element and a hologram element.

A proposed device may be manufactured using any suitable material, for example, glass, polymers, or crystals. In the disclosure, materials and parameters are not limited to those enumerated, which will be obvious to a person skilled in the art. However, all options do not limit the disclosure because the options are obvious to a person skilled in the art.

Figure 3:
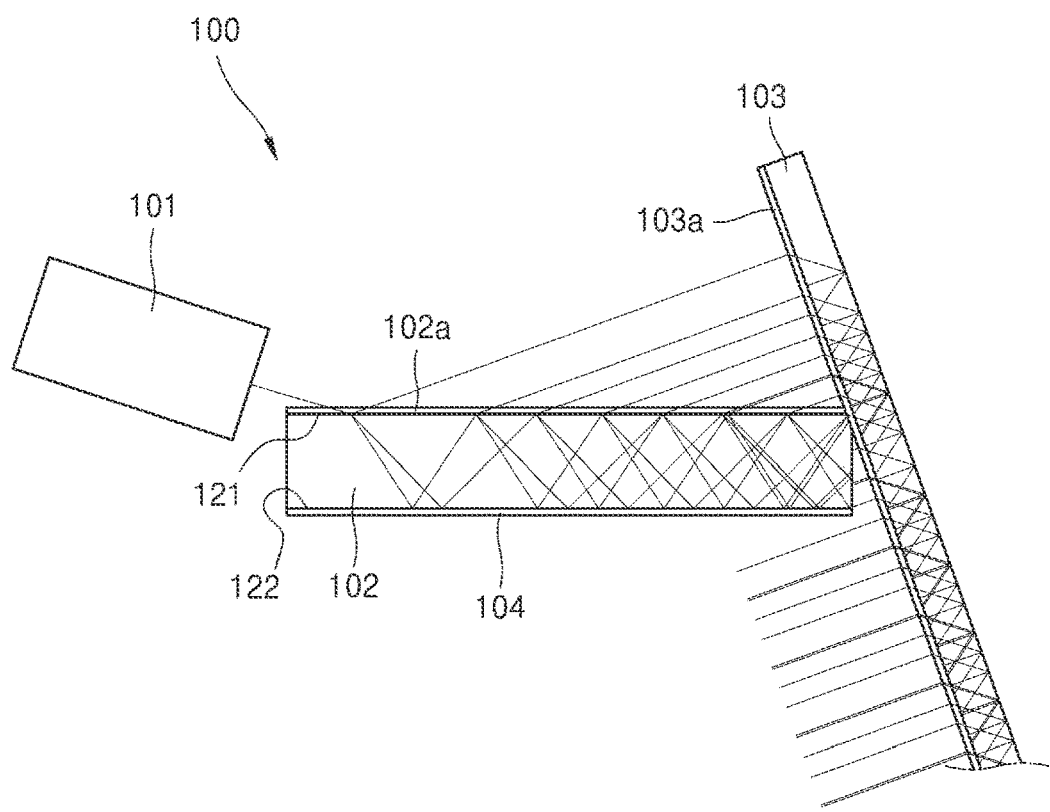
FIG. 3 is a schematic view of a near-eye display device according to an embodiment of the disclosure.

FIG. 3 is a view of a near-eye display device 100 according to an embodiment of the disclosure.

Referring to FIG. 3, the near-eye display device 100 may include a projection system 101 providing an image, a first expanding waveguide 102 upon which light from the projection system 101 is incident, and a second waveguide 103 upon which light from the first expanding waveguide 102 is incident.

The first expanding waveguide 102 may include a first plane 121, and a second plane 122 facing the first plane 121. The light from the projection system 101 may be incident upon the first surface 121 of the first expanding waveguide 102. The first expanding diffractive grating 102a may be located on the first surface 121.

A reflective coating 104 may be formed on the second surface 122 of the first expanding waveguide 102. The reflective coating 104 may improve optical efficiency of the first expanding waveguide 102. The embodiment may increase optical efficiency compared with a case where the first expanding diffractive grating 102a is located on the second surface 122. The reflective coating 104 may prevent light loss from occurring when the first expanding diffractive grating 102a is located on the second surface 122.

The first expanding diffractive grating 102a may be included in the first expanding waveguide 102 such that a boundary between the first expanding diffractive grating 102a and the first expanding waveguide 102 has any of various geometrical figures, for example, a rectangle, a polygon, or an arbitrary geometrical figure having an arch-shaped face. In other words, a boundary surface where the first expanding diffractive grating 102a meets the first expanding waveguide 102 may have any of various geometrical figures. Alternatively, according to a method of forming a diffraction structure, the first expanding diffractive grating 102a may be directly formed on a surface of the first expanding waveguide 102.

The first expanding diffractive grating 102a may be of symmetrical or asymmetrical type. Another boundary profile may affect the performance of an image and the uniformity of an image of an eye. A boundary profile between the first expanding diffractive grating 102a and the first expanding waveguide 102 may be selected according to an objective such as an objective of obtaining a given picture of an image intensity distribution at different places or compensating for an image brightness that is non-uniform from a projection system over the field of view.

The second diffractive grating 103a may have a plurality of regions having different diffraction efficiencies. By being combined with all elements for a device for displaying augmented reality, various structures of diffraction efficiency may compensate for non-uniform brightness in the field of view and increasing the uniformity of an image seen by the eye.

Figure 4:
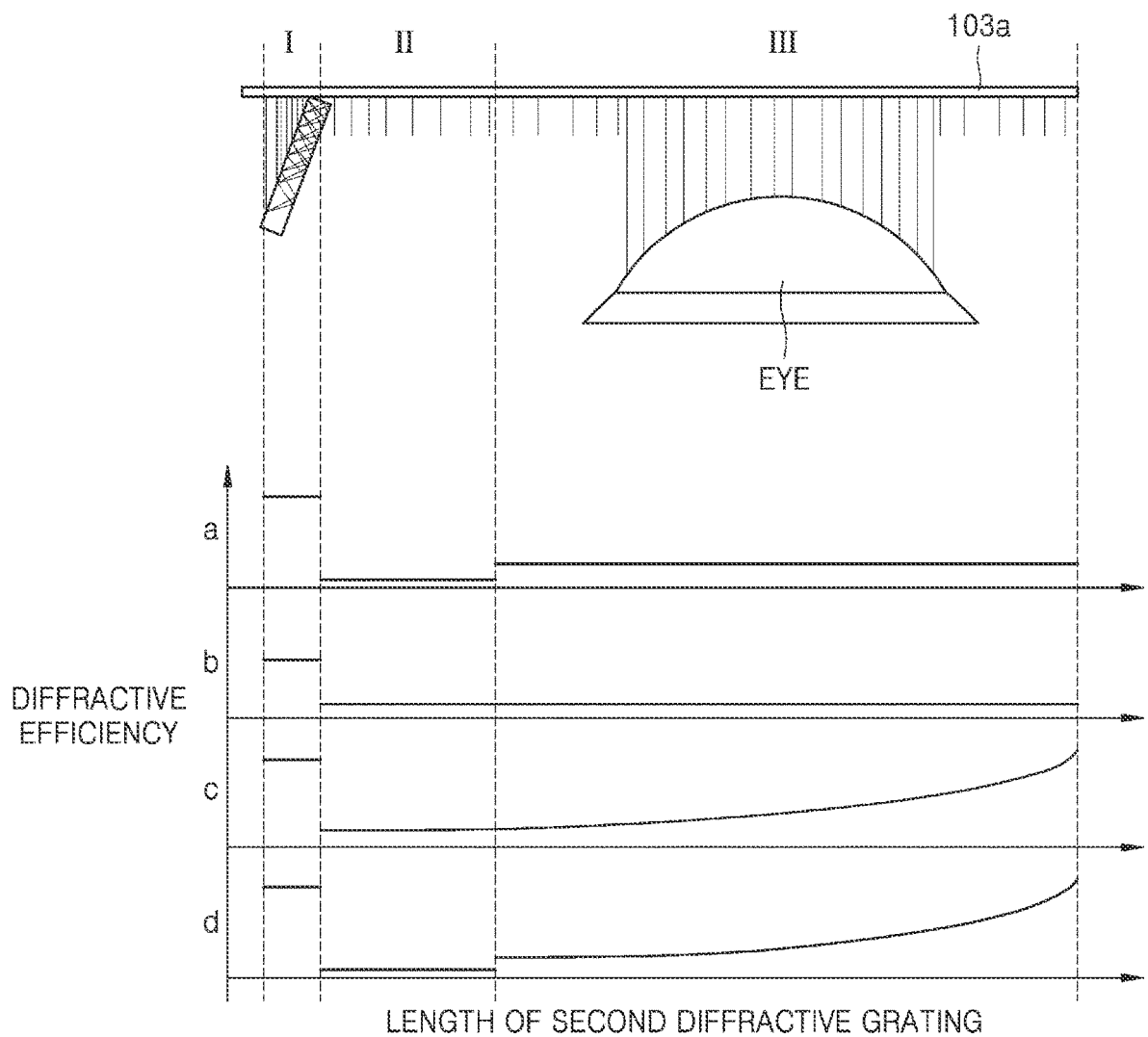
FIG. 4 illustrates diffraction efficiency according to a length of a second diffractive grating of a near-eye display device, according to an embodiment of the disclosure.

FIG. 4 illustrates a plurality of regions according to diffraction efficiency of the second waveguide 103 according to an embodiment of the disclosure.

Referring to FIG. 4, the entire region of the second diffractive grating 103a may be split into several regions. For example, the second diffractive grating 103a may include a first region I to which light is input, a second region II where output light does not enter an eye, and a third region III where output light enters the eye. While seeing in an eyeball movement field, when moving the pupil of the eye, light from the third region III may enter the pupil of the eye. For example, the first region I may include an input coupling diffractive grating, and the third region III may include an output coupling diffractive grating.

Referring to FIG. 4, the second diffractive grating 103a may have different diffraction efficiencies in the first, second, and third regions I, II, and III. Respective diffraction efficiency distributions of the first, second, and third regions I, II, and III of the second diffractive grating 103a are schematically illustrated in graphs.

The second diffractive grating 103a may provide diffraction efficiency in various forms.

For example, a) of FIG. 4 will be described below.

Because light emitted from the first expanding waveguide 102 is incident upon the second waveguide 103, the first region I of the second diffractive grating 103a to which light is input may have maximum diffraction efficiency. The first region I may have the lowest loss. The maximum diffraction efficiency of the second diffractive grating 103a may provide a high image brightness and a wide brightness to a user.

The second region II may have minimum diffraction efficiency. In an ideal case, diffraction efficiency of the second region II may be 0.

The third region III may have a relatively low diffraction efficiency in a useful light output field, thereby ensuring a uniform image output, namely, a uniform image brightness. As a result, a relationship of diffraction efficiency of the first region I>diffraction efficiency of the third region III>diffraction efficiency of the second region II may be established.

Next, b) of FIG. 4 will be described.

Because the first region I is a region of the second diffractive grating 103a upon which light is incident, the first region I may have maximum diffraction efficiency, and thus light emitted from the first expanding waveguide 102 may have the lowest loss and may be incident into the second diffractive grating 103a. The maximum diffraction efficiency may provide a high image brightness, and thus may provide a wide brightness setup for the user.

The second region II and the third region III may have average diffraction efficiency that is less than the maximum diffraction efficiency. The average diffraction efficiency, which represents an average of maximum efficiencies for diffractive grating types that are used, may refer to a middle value between the maximum efficiency and the minimum efficiency. Accordingly, a relationship of diffraction efficiency of the first region I>diffraction efficiency of the second region II=diffraction efficiency of the third region III may be established.

Next, c) of FIG. 4 will be described.

Because the first region I is a region of the second diffractive grating 103a upon which light is incident, the first region I may have maximum diffraction efficiency, and thus light emitted from the first expanding waveguide 102 may have lowest loss and may be incident into the second diffractive grating 103a.

The second region II and the third region III may have gradient diffraction efficiency. Diffraction efficiency may have a distribution gradually increasing from the second region II to the third region III. In this case, compared with a) of FIG. 4, overall optical efficiency of a near-eye display device may increase.

Next, d) of FIG. 4 will be described.

Because the first region I is a region of the second diffractive grating 103a upon which light is incident, the first region I may have maximum diffraction efficiency, and thus light emitted from the first expanding waveguide 102 may have lowest loss and may be incident into the second diffractive grating 103a.

The second region II may have minimum diffraction efficiency.

The third region III may have gradient diffraction efficiency.

In the case of d) of FIG. 4, the second waveguide 103 has good optical efficiency. In the case of b) of FIG. 4, the second diffractive grating is easily manufactured.

Figure 5:
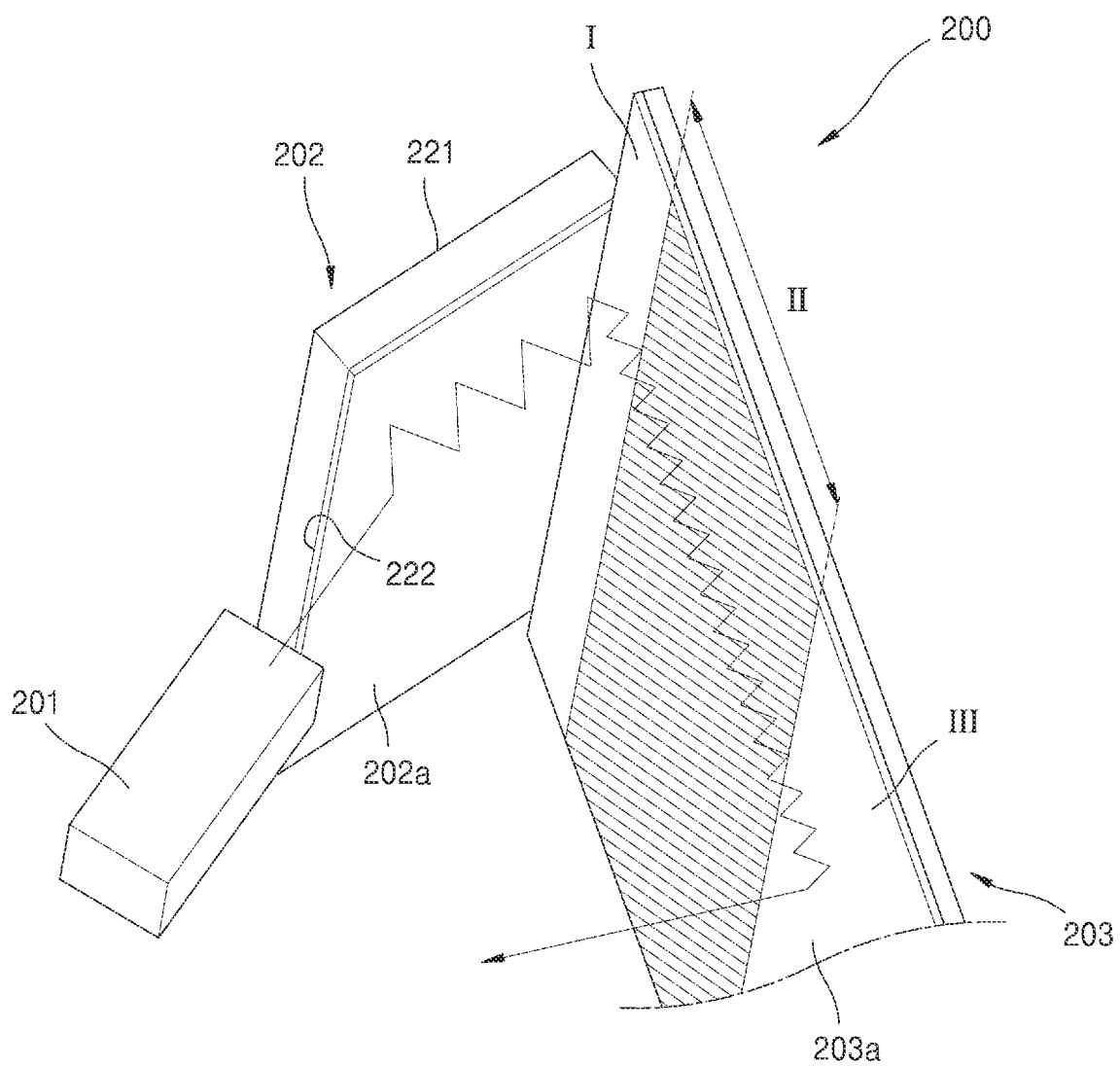
FIG. 5 is a schematic view of a near-eye display device according to an embodiment of the disclosure.

FIG. 5 is a perspective view of a near-eye display device 200 according to an embodiment of the disclosure.

Referring to FIG. 5, the near-eye display device 200 may include a projection system 201, a first expanding waveguide 202, and a second waveguide 203. A first expanding diffractive grating 202a may be included in the first expanding waveguide 202. The first expanding waveguide 202 may include a first surface 221, and a second surface 222 facing the first surface 221. For example, the first expanding diffractive grating 202a may be arranged on the second surface 222. A second expanding diffractive grating 203a may be included in the second waveguide 203. Light from the projection system 201 may be incident toward the second surface 222 of the first expanding waveguide 202.

The second waveguide 203 may include a first region I to which light is input, a second region II where output light does not enter an eye, and a third region III where output light enters the eye. While seeing in an eyeball movement field, when moving the pupil of the eye, light from the third region III may enter the pupil of the eye.

Diffraction may not occur in the second region II of the second waveguide 203. In other words, diffraction efficiency of the second region II may be 0.

For example, the second region II of the second waveguide 203 may not include the second diffractive grating 203a or may have zero diffraction efficiency. The second region II may not have any functional load for outputting light. Light may not be emitted from the second waveguide 203 through the second region II of the second waveguide 203, and may farther travel along the second waveguide 203 due to internal total reflection. Accordingly, light loss may be reduced.

Figure 6:
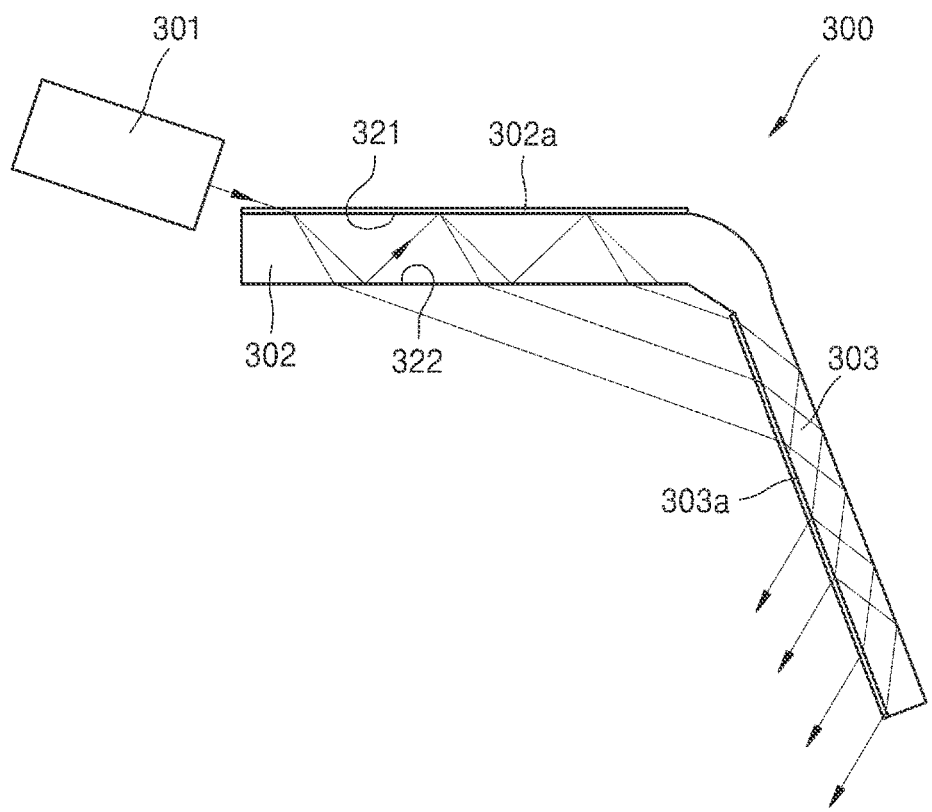
FIG. 6 is a schematic view of a near-eye display device according to an embodiment of the disclosure.

FIG. 6 is a view of a near-eye display device 300 according to an embodiment of the disclosure.

Referring to FIG. 6, the near-eye display device 300 may include a projection system 301, a first expanding waveguide 302, and a second waveguide 303. According to the embodiment, the first expanding waveguide 302 and the second waveguide 303 may be integrally formed with each other. A first expanding diffractive grating 302a may be included in the first expanding waveguide 302. The first expanding waveguide 302 may include a first surface 321, and a second surface 322 facing the first surface 321. For example, the first expanding diffractive grating 302a may be arranged on the second surface 321. However, embodiments are not limited thereto, and a first expanding diffractive grating may be arranged on the second surface 322. A second expanding diffractive grating 303a may be included in the second waveguide 303. Light from the projection system 301 may be incident upon the first surface 221 of the first expanding waveguide 302.

The first expanding waveguide 302 and the second waveguide 303 may be configured with a monolithic curved waveguide. The first expanding waveguide 302 may constitute a portion of a waveguide curved in one direction, and the second waveguide 203 may constitute a portion of the same waveguide curved in another direction. The embodiment is favorable in manufacturing glasses based on a near-eye display device. An operation principle of the embodiment is the same as the description given above.

Figure 7:
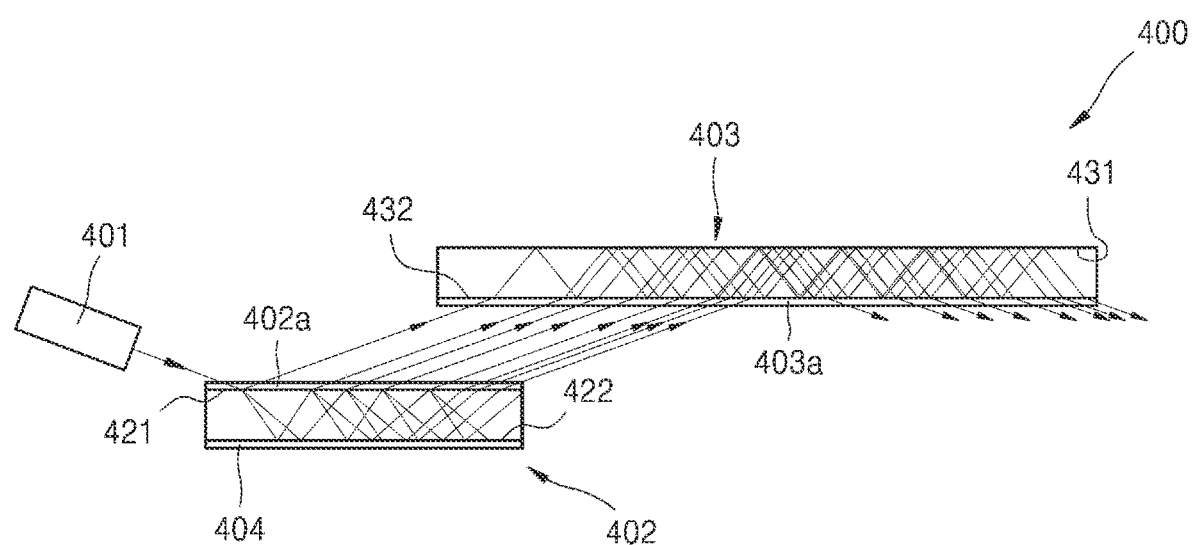
FIG. 7 is a schematic view of a near-eye display device according to an embodiment of the disclosure.

FIG. 7 is a view of a display device 400 according to an embodiment of the disclosure.

Referring to FIG. 7, the display device 400 may include a projection system 401, a first expanding waveguide 402, and a second waveguide 403. The first expanding waveguide 402 may include a first surface 421, and a second surface 422 facing the first surface 421. The first surface 421 and the second surface 422 may be parallel to each other. A first expanding diffractive grating 402a may be arranged on the first surface 421 of the first expanding waveguide 402. A reflective coating 404 may be arranged on the second surface 422.

A second expanding diffractive grating 403a may be included in the second waveguide 403. Light from the projection system 401 may be incident upon the first expanding diffractive grating 402a of the first expanding waveguide 402. The second waveguide 403 may include a third surface 431, and a second surface 432 facing the third surface 431. The third surface 431 and the fourth surface 432 may be parallel to each other. The second expanding diffractive grating 403a may be arranged on the fourth surface 432. Light output by the first expanding waveguide 402 may be incident upon the fourth surface 432.

The first expanding waveguide 402 and the second waveguide 403 may be, for example, arranged parallel to each other. A portion of the first surface 421 of the first expanding waveguide 402 may be arranged to face a portion of the fourth surface 422 of the second waveguide 403 by overlapping the portion of the fourth surface 422 of the second waveguide 403. The first expanding waveguide 402 and the second waveguide 403 may be arranged apart from each other. For example, the second waveguide 403 may be located over the first expanding waveguide 402. The embodiment is favorably applicable to augmented reality helmet-mounted systems.

A near-eye display device according to an embodiment is applicable to, for example, augmented reality glasses.

Augmented reality glasses may include a first element for a left eye and a second element for a right eye.

Figure 8A:
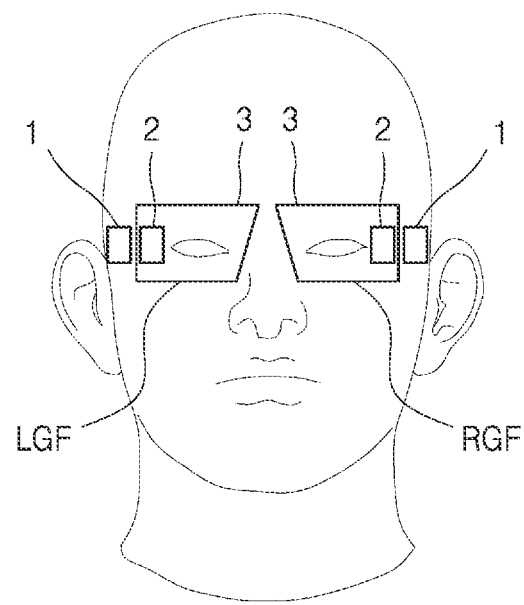
FIGS. 8A, 8B, and 8C are views schematically illustrating near-eye display devices according to various embodiments of the disclosure.
Figure 8B:
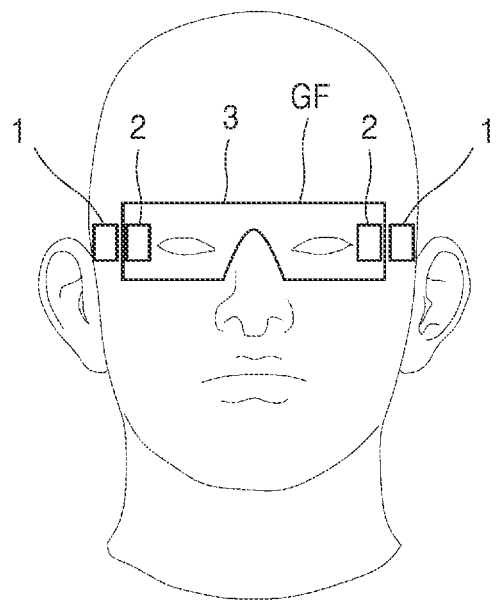
Figure 8C:
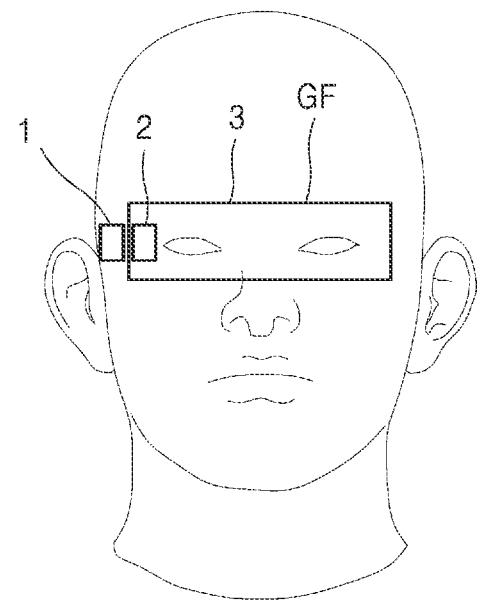

FIGS. 8A to 8C are views schematically illustrating near-eye display devices according to various embodiments of the disclosure.

Referring to FIG. 8A, augmented reality glasses may include a first element for generating and transmitting an image for a left eye and a second element for generating and transmitting an image for a right eye.

Referring to FIG. 8A, each of the first element and the second element may include the projection system 1, and the first expanding waveguide 2 having the first expanding diffractive grating 2a. A second waveguide 3 and a second diffractive grating 3a of the first element for a left eye may be arranged on a left glass frame (LGF) arranged on the left eye. A second waveguide 3 and a second diffractive grating 3a for a right eye may be arranged on a right glass frame (RGF) arranged on the right eye. According to the embodiment, different images may be provided to the left eye and the right eye, and thus a stereo image may be provided.

In augmented reality glasses of FIG. 8B, the first element (for a left eye) may be coupled to the second element (for a right eye). For example, the second waveguide 3 of the first element (for a left eye) may be commonly used in the second element (for a right eye). The projection system 1 and the first expanding waveguide 2 may be included for each of the left eye and the right eye. A second waveguide 3 having a second diffractive grating 3a for inputting/outputting, which is common to the left eye and the right eye, may be arranged on a common glass frame (GF) that is located over the left eye and the right eye. The second waveguide 3 may combine respective field of views for the left eye and the right eye with each other.

Each of the first element and the second element includes the projection system 1 and the first expanding waveguide 2 having the first expanding diffractive grating 2a, and the first element and the second element are located on lateral sides of the left eye and the right eye, respectively. In this embodiment, the two projection systems 1 has a single common driver for synchronizing their operations, but may not provide a stereo image.

FIG. 8C illustrates another example of augmented reality glasses according to an embodiment of the disclosure.

According to the embodiment, the first element (for a left eye) may be coupled to the second element (for a right eye). In other words, the first element may be commonly used for the left eye and the right eye. The second waveguide 3 including the second diffractive grating 3a may be arranged on the common glass frame (GF) located over the left eye and the right eye. According to the embodiment, the first element (for a left eye) and the second element (for a right eye) may include a single projection system 1 and a single first expanding waveguide 2, and the projection system 1 and the first expanding waveguide 2 may be arranged on a lateral side of the left or right eye.

Figure 9:
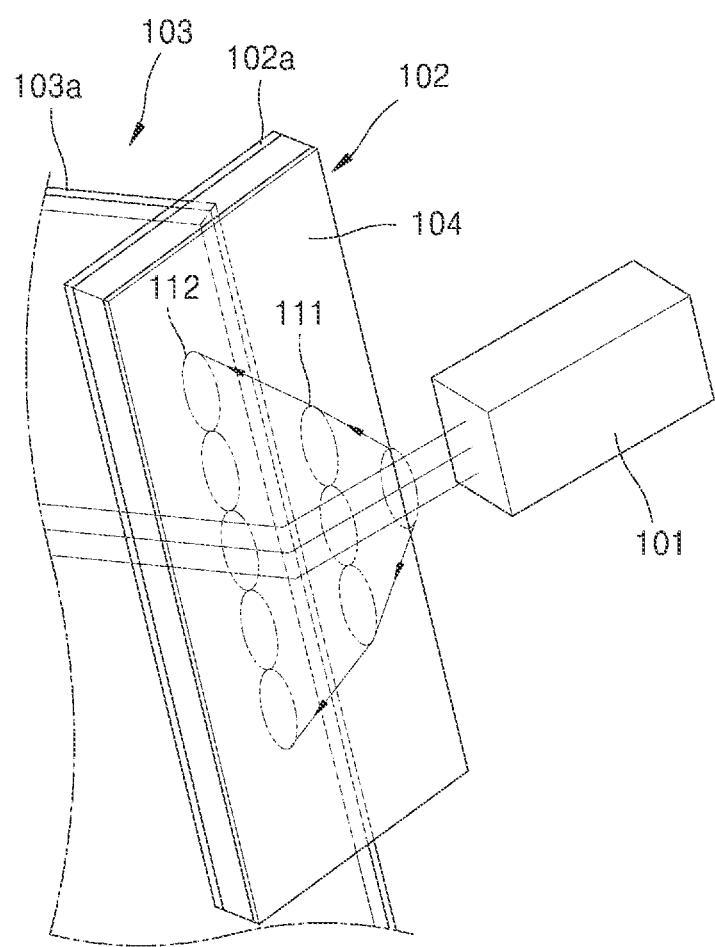
FIGS. 9 and 10 are views for explaining an operation method of a near-eye display device, according to various embodiments of the disclosure.
Figure 10:
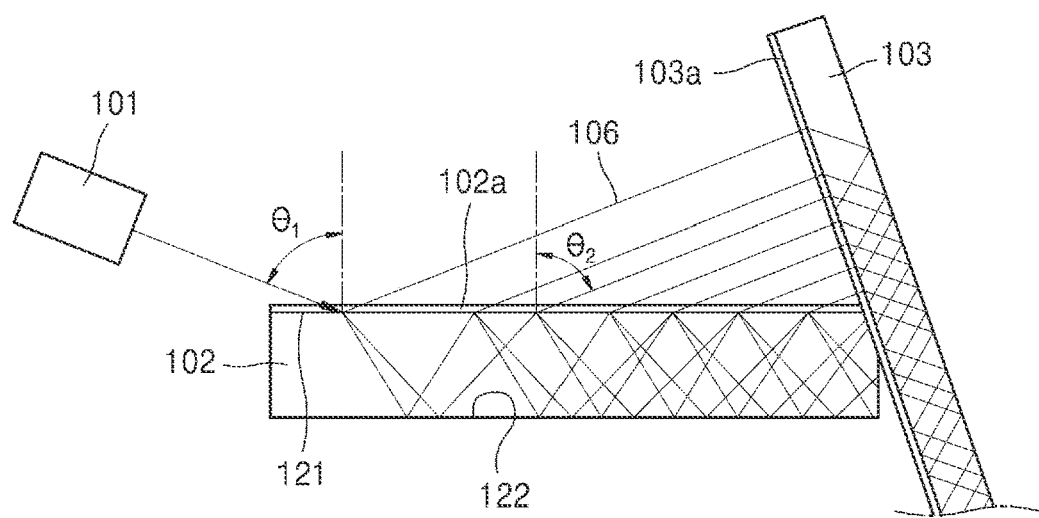

FIGS. 9 and 10 are views for explaining an operation method of a near-eye display device, according to various embodiments of the disclosure. The operation method of a near-eye display device, according to an embodiment, will be described with reference to the embodiment of FIG. 3.

According to an embodiment, (+1)-order light, 0-order light, and (−1)-order light may be all used. Referring to FIG. 9, the first expanding diffractive grating 102a and the first diffractive grating 103a may be located on different planes, and light may be output at the same angle as an input angle of light. Accordingly, an image seen by an eye is not limited by a coordinate axis. An image is bright, an eye movement region is expanded, and the image is more convenient for users. For example, a small projector such as a digital micro-mirror device (DMD) projector, a liquid crystal on silicon (LCoS) projector, a spatial light modulators (SLM) projector, or a laser scanner projector may be used as the projection system 101.

FIGS. 9 and 10 illustrate how light is expanded in the first expanding waveguide 2 when the first expanding diffractive grating 102a is arranged on the first surface 121 of the first expanding waveguide 102.

Referring to FIGS. 9 and 10, the first expanding waveguide 102 including the first expanding diffractive grating 102a may be arranged on a region of an exit pupil of the projection system 101. The first expanding waveguide 102 may be fabricated from any suitable material, such as glass, plastic, or a crystalline material, by using a typical method.

Figure 11:
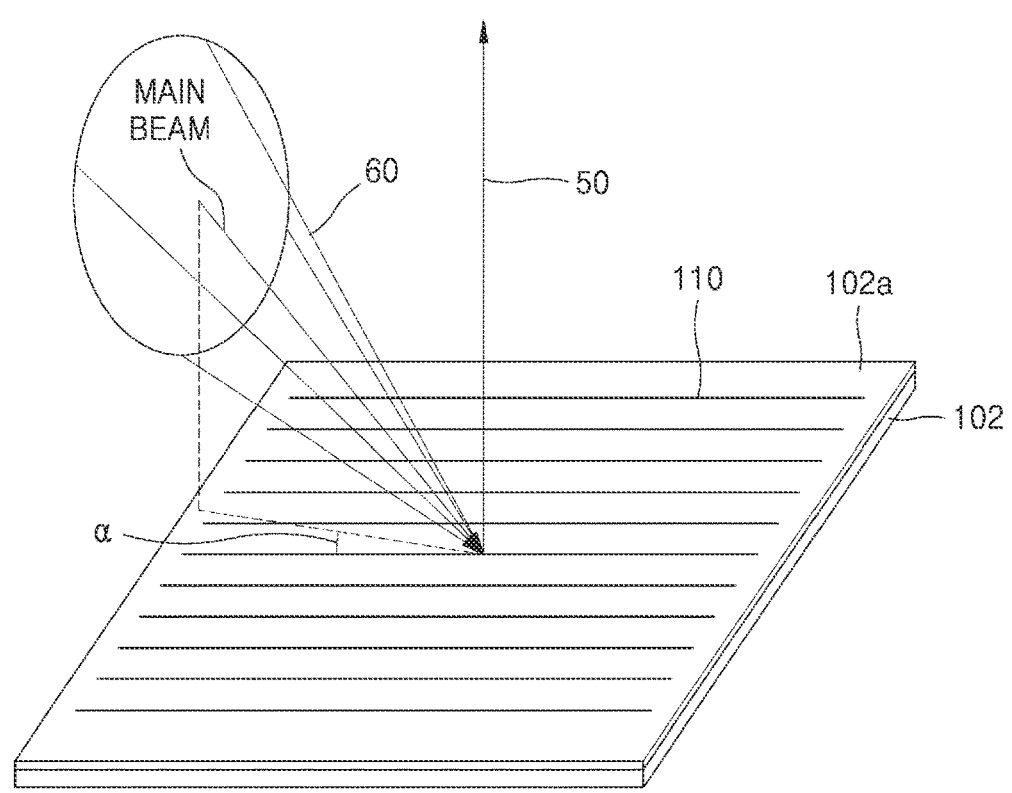
FIG. 11 schematically illustrates a structure of an expanding diffractive grating of a near-eye display device, according to an embodiment of the disclosure.

FIG. 11 schematically illustrates a structure of an expanding diffractive grating of a near-eye display device, according to an embodiment of the disclosure.

Referring to FIG. 11, it should be noted that it is important how grating lines 110 of the first expanding diffractive grating 102a are located with respect to incident light. FIG. 11 is a view illustrating a relative arrangement of the grating lines 110 of the first expanding diffractive grating 102a with respect to incident light 60. The first expanding diffractive grating 102a may diffract the incident light into (−1)-order light, 0-order light, and (+1)-order light. For example, one order may include diffracted light 50 that may be reflected off of the first expanding diffractive grating 102a. In this case, all diffraction orders may be useful. A condition necessary for expanding (multiplying) light from the projection system 101 is a layout location of the grating lines 110 of the first expanding diffractive grating 102a arranged in a propagation direction of a field center of the projection system 101.

One of ordinary skill in the art knows concepts such as an angular field and a linear field. However, in the application, the angular field is related to terms of a field center and a field edge. In other words, the grating lines 110 of the first expanding diffractive grating 102a may be located according to projection of incident light 60 onto the first expanding diffractive grating 102a. An acute angle (a) between a projection of the incident light 60 of a main beam of the projection system 101 onto the plane of the first expanding waveguide 102 and the grating lines 110 may be in the range of (−)30 degrees to (+) 30 degrees.

Referring to FIGS. 9 and 10, a beam from the projection system 101 may be incident upon the first expanding diffractive grating 102a, and, as a result of diffraction, the beam may be split into several rays (diffraction orders) expanding at certain angles with respect to an entrance angle. 0-order diffracted light may be derived from these several rays, and these rays may not change expansion directions of not only (−1)-order diffraction but also (+1)-order diffraction with respect to the incident light.

(−1)-order diffracted light and (+1)-order diffracted light may expand at symmetrical angles with respect to the incident light. A 0-order diffracted light 106 may pass through the first expanding waveguide 102, and may be emitted from the first expanding waveguide 102 at an exit angle $\theta_2$, which is the same as an entrance angle $\theta1$ of the incident light, and may be incident upon the second diffractive grating 103a of the second waveguide 103. The entrance angle $\theta1$ and the exit angle $\theta_2$ are based on a normal to the first expanding diffractive grating 102a.

The (−1)-order diffracted light and the (+1)-order diffracted light remain in the first expanding waveguide 102, are propagated from the first expanding waveguide 102, are reflected by the second surface 122, namely, a surface opposite to the first expanding diffractive grating 102a, and are fed back to the first expanding diffractive grating 102a via internal total reflection. Each of the (−1)-order diffracted light and the (+1)-order diffracted light undergoes diffraction, and, as a result, forms 0-order light, (−1)-order light, and (+1)-order light again, thereby forming a first expanded region 111. The 0-order diffracted light is emitted from the first expanding waveguide 102 and enters the second diffractive grating 103a of the second waveguide 103. As described above, each of the (−1)-order light and the (+1)-order light may expand in the first expanding waveguide 102 to form a second expanded region 112. Each diffracted light may be diffracted again into a new 0 order, a new (−1) order, and a new (+1) order. Although only a first expanded region and a second expanded region are illustrated in the drawings, more expanded regions may be formed. As a result, as shown in FIG. 9, an exit pupil may be multiplied by the first expanded region 111 and the second expanded region 112 with respect to light entering the first expanding waveguide 102.

After the 0-order diffracted light from the first expanding waveguide 102 is incident upon the second waveguide 103, the 0-order diffracted light is incident upon the second diffractive grating 103a in the second waveguide 103 and thus heads toward the eye, and the 0-order light, the (−1)-order light, and the (+1)-order diffracted light are formed again. The (−1)-order diffracted light is expanded beyond the eye and thus may become useless. The 0-order diffracted light may pass through the second waveguide 103 and may be emitted from the second waveguide 103 in the same direction as an initial beam from the projection system 101. Only the (+1)-order diffracted light expanding at an angle of the 0-order diffracted light may undergo CIR in the second waveguide 103 and may remain in the second waveguide 103. The (+1)-order diffracted light re-enters the second diffractive grating 103a from the inside of the second waveguide 103 and is split again into a 0-order, a (+1) order, and a (−1) order, and the new 0-order diffracted light is emitted from the second waveguide 103 and enters the eye. Then, when the new (+1)-order diffracted light is further expanded along the second waveguide 103, the above process may be repeated, and each of the 0-order diffracted light may enter the eye as described above.

Due to the above-described light expansion, a plurality of exit pupils (see 111 and 112 of FIG. 9) exist and are spaced apart from each other, and thus a field where the eye is able to move, namely, a field where an image does not appear from the field of view of the eye, may be widely formed. Accordingly, an eyeball movement region may be widely formed. Because a near-eye display device according to an embodiment expands light and uses all diffraction orders, the near-eye display device according to an embodiment may reduce light loss from the projection system 101.

When the first expanding diffractive grating 102a is located on the first surface 121 of the first expanding waveguide 102 upon which light from the projection system 101 is incident, the light from the projection system 101 may be incident upon the first expanding diffractive grating 102a and may be diffracted into the (+1)-order light, the 0-order light, and the (−1)-order light. The 0-order diffracted light is output from the first expanding waveguide 102 and enters the second diffractive grating 103a.

When the second surface 122 of the first expanding waveguide 102 includes the reflective coating 104 and the first expanding diffractive grating 102a is located on the first surface 121 of the first expanding waveguide 102, both the (−1)-order diffraction and the 0-order diffraction are reflected by the reflective coating 104 and are emitted through the first surface 121 of the first expanding waveguide 102.

When the first expanding diffractive grating 102a is located on the second surface 122, the light from the projection system 101 enters the first expanding waveguide 102, is diffracted into a (+1) order, a 0 order, and a (−1) order while passing through the first expanding diffractive grating 102a, and the 0-order diffracted light is output from the second surface 122 of the first expanding waveguide 102 and enters the second diffractive grating 103a.

As described above, to effectively multiply light, the light from the projection system 101 may be incident upon the first expanding waveguide 102, and an angle of entering the first expanding diffractive grating 102a may be in the range of 0 to 90 degrees with respect to a normal to the first surface 121 of the first expanding waveguide 102. The light from the projection system 101 is incident between the first surface 121 of the first expanding waveguide 102 and the normal of the first surface 121. As described above, an acute angle between a projection of a main beam of the projection system 101 onto the first plane 121 of the first expanding waveguide 102 and the grating lines 110 may be in the range of 30 degrees.

According to an embodiment, the second diffractive grating 103a formed on the second waveguide 103 may be used both to receive incident light from the first expanding waveguide 102 and to output light to an eye region. A direction of the same grating line of the second diffractive grating 103a may be used to input light to the second waveguide 103 due to the location of the first expanding waveguide 102a including the first expanding diffractive grating 102 and output light from the second waveguide 103 to the eye region. This is because the first expanding waveguide 102 including the first expanding diffractive grating 102a is located on a different plane from the plane on which the second waveguide 103 including the second diffractive grating 103a is located.

For clarity, merits according to various embodiments will now be described through a comparison with a comparative example of FIGS. 12 and 13.

Figure 12:
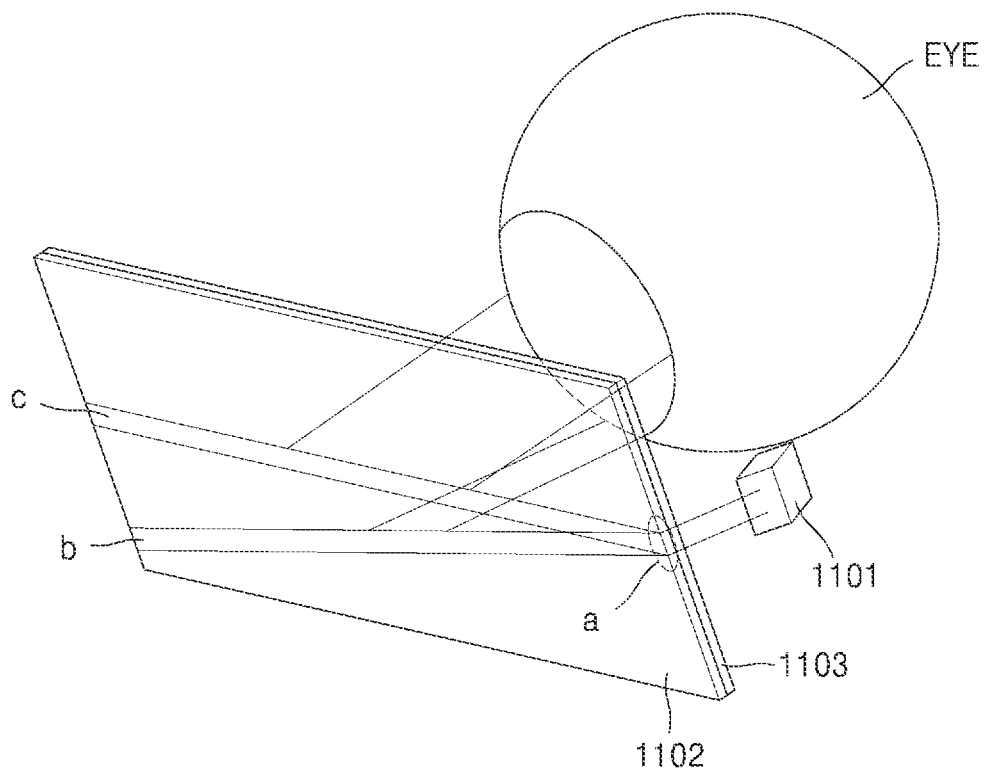
FIG. 12 is a view for explaining an operation of a near-eye display device, according to an embodiment of the disclosure.

FIG. 12 illustrates elements of a typical augmented reality device according to an embodiment of the disclosure. FIG. 13 is a view for explaining an operation of a near-eye display device, according to an embodiment of the disclosure.

The typical augmented reality device of FIG. 12 includes a projection system 1101, a waveguide 1102, and a diffractive grating 1103 included in the waveguide 1102. Radiation from the projection system 1101 enters the waveguide 1102 through a narrow radiation area (a). After light passes through the diffractive grating 1103, only one diffraction order enters the waveguide 1102, and there is no intersection of different areas of the field of view in a region where light enters an eye. A lower portion of the field of view expands obliquely along the waveguide 1102 into a region (b), and, when the eye looks at the center or top of the field of view, no light enters the pupil of the eye. Because output light only comes out of a central portion of the field of view through a narrow area (c), when the eye looks at the central portion of the field of view, only a narrow strip of image is seen as a result.

Figure 13:
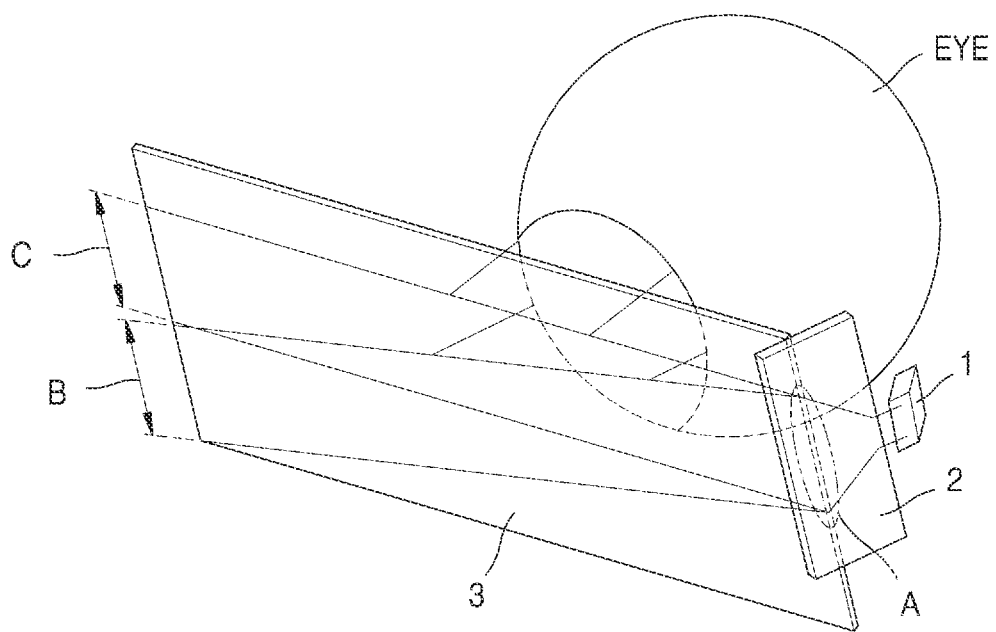
FIG. 13 is a view for explaining an operation of a near-eye display device, according to an embodiment of the disclosure.

However, referring to FIG. 13, when the first expanding waveguide 2 is used according to an embodiment, light expanded by the projection system 1 through the first expanding waveguide 2 is input to an expanded region (A) in the second waveguide 3, and the expanded light enters the pupil of the eye while intersecting a region (B) and a region (C). A wide field of view of eye movement may be provided while a lower portion of an image and an upper portion of the image are being maintained.

In a solution known from a related art, when the width of a field of view is limited, the edge of an image is sharp because internal total reflection is disturbed, but the light serving as the edge of the image does not enter the field of view of an eye movement, and thus cannot be seen. However, near-eye display devices according to various embodiments may enable a user to see the entire image with a wide field of view.

The claimed disclosure, due to its wide field of view, may provide a user with a wide field of view of eye movement and may provide an interesting presence in, for example, games or movies. A high resolution may provide a realistic presence. Users may see all the details that are almost the same as the real world. Users may watch a movie using glasses including a device that displays augmented reality, and may fully immerse themselves in the virtual world.

A near-eye display device according to an embodiment may be used in AR/VR, heads up display (HUD), and high mounted display (HMD) devices that need to have a high-resolution image and a wide field of view. Augmented reality glasses using a proposed device to display augmented reality in bright ambient lighting including sunlight may provide bright and clear images.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A near-eye display device comprising:
    a projection system configured to project light to display an image;
    a first expanding waveguide including a first surface, a second surface opposite to the first surface, and a first expanding diffractive grating disposed on one of the first surface or the second surface, wherein the light projected from the projection system is incident upon the first surface or the second surface; and
    a second waveguide upon which light emitted from the first expanding waveguide is incident,
    wherein the second waveguide includes a second diffractive grating,
    wherein the light from the projection system is incident upon the first expanding diffractive grating included in the first expanding waveguide to form (−1)-order diffraction, 0-order diffraction, and (+1)-order diffraction from respective diffractions of light beams,
    wherein the first expanding diffractive grating and the second diffractive grating are located on different planes so that 0-order diffracted light emitted from the first expanding waveguide is incident upon the second waveguide,
    wherein (−1)-order diffracted light and (+1)-order diffracted light are extended in the first expanding waveguide due to internal total reflection,
    wherein the extended (−1)-order diffracted light and the extended (+1)-order diffracted light are fed back to the first expanding diffractive grating, and the extended (−1)-order diffracted light and the extended (+1)-order diffracted light are incident upon different locations on the first expanding diffractive grating, and
    wherein new (−1)-order diffraction, new 0-order diffraction, and new (+1)-order diffraction are formed from each of the extended (−1)-order diffracted light and the extended (+1)-order diffracted light.

2. The near-eye display device of claim 1,
    wherein the light projected from the projection system is incident upon the first expanding waveguide, and
    wherein an angle at which the light is incident upon the first expanding diffractive grating has a range of 0 to 90 degrees with respect to normal to a surface of the first expanding waveguide.

3. The near-eye display device of claim 1, wherein a grating line of the first expanding diffractive grating is arranged along a projection of light from the projection system onto the first expanding diffractive grating.

4. The near-eye display device of claim 1, wherein an acute angle between a projection of a main light beam of the projection system onto a plane of the first expanding waveguide and a grating line of the first expanding diffractive grating has a range of (+) 30 degrees to (−) 30 degrees.

5. The near-eye display device of claim 1, wherein the first expanding diffractive grating is located on the first surface of the first expanding waveguide upon which the light projected from the projection system is incident.

6. The near-eye display device of claim 5, wherein the second surface of the first expanding waveguide includes a mirror coating.

7. The near-eye display device of claim 1, wherein the second waveguide includes a first region upon which the light is incident, a second region where the light does not enter an eye of a user, and a third region where the light enters a pupil of the eye.

8. The near-eye display device of claim 7, wherein the near-eye display device is configured so that diffraction does not occur in the second region of the second waveguide.

9. The near-eye display device of claim 7, wherein the second diffractive grating is configured to have a relationship of a diffraction efficiency of the first region>a diffraction efficiency of the third region>a diffraction efficiency of the second region.

10. The near-eye display device of claim 7, wherein the second diffractive grating is configured to have a relationship of a diffraction efficiency of the first region>a diffraction efficiency of the second region=a diffraction efficiency of the third region.

11. The near-eye display device of claim 7, wherein the first region of the second diffractive grating has high diffraction efficiency and the second region and the third region have gradient diffraction efficiency.

12. The near-eye display device of claim 1, wherein the first expanding waveguide and the second waveguide constitute a monolithic curve-shaped waveguide.

13. The near-eye display device of claim 1,
    wherein the second surface of the first expanding waveguide includes a mirror coating formed thereon, and
    wherein the first surface of the first expanding waveguide includes the first expanding diffractive grating and is free from the mirror coating.

14. The near-eye display device of claim 1, wherein the 0-order diffracted light emitted from the first expanding waveguide is emitted from the first expanding waveguide at a same angle as an angle at which the light is incident upon the first expanding waveguide.

15. Augmented reality glasses comprising:
    an element for a left eye and an element for a right eye,
    wherein at least one of the element for the left eye or the element for the right eye comprises a projection system, a first expanding waveguide including a first surface, and a second surface opposite to the first surface,
    wherein light projected from the projection system is incident upon the first surface, a first expanding diffractive grating included in the first expanding waveguide, a second waveguide upon which light emitted from the first expanding waveguide is incident, and a second diffractive grating included in the second waveguide,
    wherein the light from the projection system is incident upon the first expanding diffractive grating included in the first expanding waveguide to form (−1)-order diffraction, 0-order diffraction, and (+1)-order diffraction from respective diffractions of light beams,
    wherein the first expanding diffractive grating and the second diffractive grating are located on different planes so that 0-order diffracted light output by the first expanding waveguide is incident upon the second waveguide,
    wherein (−1)-order diffracted light and (+1)-order diffracted light are extended in the first expanding waveguide due to internal total reflection,
    wherein the extended (−1)-order diffracted light and the extended (+1)-order diffracted light are fed back to the first expanding diffractive grating, and the extended (−1)-order diffracted light and the extended (+1)-order diffracted light are incident upon different locations on the first expanding diffractive grating, and
    wherein new (−1)-order diffraction, new 0-order diffraction, and new (+1)-order diffraction are formed from each of the extended (−1)-order diffracted light and the extended (+1)-order diffracted light.

16. The augmented reality glasses of claim 15, wherein the element for the left eye is integral with the element for the right eye.

17. The augmented reality glasses of claim 15, wherein the element for the left eye is separate from the element for the right eye.

18. The augmented reality glasses of claim 15,
wherein the first expanding waveguide includes a plurality of regions, and
wherein at least two of the plurality of regions have different diffractive values.

19. An operation method of a near-eye display device, the operation method comprising:
projecting light from a projection system onto a first expanding diffractive grating;
diffracting the light projected from the projection system onto the first expanding diffractive grating to form a (−1)-order diffraction, a 0-order diffraction, and a (+1)-order diffraction from respective diffractions of light beams incident upon the first expanding diffractive grating;
outputting 0-order diffracted light from a first expanding waveguide and inputting the 0-order diffracted light to a second waveguide;
extending (−1)-order diffracted light and (+1)-order diffracted light in the first expanding waveguide due to internal total reflection, feeding the extended (−1)-order diffracted light and the extended (+1)-order diffracted light back to the first expanding diffractive grating, and making the extended (−1)-order diffracted light and the extended (+1)-order diffracted light be incident upon different locations on the first expanding diffractive grating; and
forming new (−1)-order diffraction, new 0-order diffraction, and new (+1)-order diffraction from each of the (−1)-order diffracted light and the (+1)-order diffracted light.

20. The operation method of claim 19,
wherein each 0-order diffracted light incident upon the second waveguide passes a second diffractive grating via the second waveguide,
wherein diffraction of each ray incident upon the second diffractive grating forms (−1)-order diffraction, 0-order diffraction, and (+1)-order diffraction, and
wherein the (+1)-order diffraction is reflected by a surface of the second waveguide opposite to a surface of the second waveguide facing an eye and is incident again upon the second diffractive grating.

* * * * *